United States Patent
Ju et al.

(10) Patent No.: US 11,342,975 B2
(45) Date of Patent: May 24, 2022

(54) COMMUNICATION METHOD AND COMMUNICATION APPARATUS OF VEHICLE

(71) Applicant: Samsung Electronics Co., Ltd., Gyeonggi-do (KR)

(72) Inventors: Seungbum Ju, Gyeonggi-do (KR); Changwon Jang, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/172,245

(22) Filed: Feb. 10, 2021

(65) Prior Publication Data

US 2021/0258051 A1 Aug. 19, 2021

(30) Foreign Application Priority Data

Feb. 13, 2020 (KR) .......... 10-2020-0017904

(51) Int. Cl.
| | |
|---|---|
| *H04B 1/38* | (2015.01) |
| *H04B 7/06* | (2006.01) |
| *H04B 1/40* | (2015.01) |
| *H04W 4/46* | (2018.01) |
| *H04W 4/48* | (2018.01) |
| *H04W 4/44* | (2018.01) |

(52) U.S. Cl.
CPC .............. *H04B 7/0608* (2013.01); *H04B 1/40* (2013.01); *H04W 4/44* (2018.02); *H04W 4/46* (2018.02); *H04W 4/48* (2018.02)

(58) Field of Classification Search
CPC ......... H04B 7/0608; H04B 1/40; H04W 4/46; H04W 4/48; H04W 4/44
USPC ........................................ 375/219, 316, 295
See application file for complete search history.

(56) References Cited

U.S. PATENT DOCUMENTS

| | | |
|---|---|---|
| 5,754,104 A | 5/1998 | Saito |
| 6,118,409 A | 9/2000 | Pietsch et al. |
| 9,344,174 B2 | 5/2016 | Ngai et al. |
| 10,044,418 B2 | 8/2018 | Fikar et al. |
| 10,236,960 B2 | 3/2019 | Xiong et al. |
| 2014/0233665 A1 | 8/2014 | Clevorn et al. |
| 2014/0364068 A1 | 12/2014 | Maguire |
| 2015/0188599 A1* | 7/2015 | Shi .......................... H04L 1/18 455/78 |

(Continued)

FOREIGN PATENT DOCUMENTS

| | | |
|---|---|---|
| CN | 109067418 A | 12/2018 |
| EP | 1742383 A1 | 1/2007 |

(Continued)

OTHER PUBLICATIONS

International Search Report dated May 20, 2021.
European Search Report dated Jul. 7, 2021.

*Primary Examiner* — Zewdu A Kassa
(74) *Attorney, Agent, or Firm* — Cha & Reiter, LLC.

(57) ABSTRACT

An electronic device is provided. The electronic device includes a transceiver associated with a plurality of antennas, and at least one processor configured to: transmit a first signal by using a preset first antenna of the plurality of antennas; receive a second signal coupled from the first signal; determine a comparison result by comparing the first signal and the second signal; perform antenna switching based on the comparison result; and use a second antenna based on the antenna switching.

19 Claims, 11 Drawing Sheets

(56) References Cited

U.S. PATENT DOCUMENTS

| | | | |
|---|---|---|---|
| 2015/0217711 A1 | 8/2015 | Kawada et al. | |
| 2017/0070246 A1* | 3/2017 | Natesan | ............... H01Q 3/24 |
| 2020/0412417 A1* | 12/2020 | Calzolari | ............ H04B 7/0608 |

FOREIGN PATENT DOCUMENTS

| | | |
|---|---|---|
| EP | 2226955 A2 | 9/2010 |
| EP | 2226955 A3 | 3/2013 |
| EP | 3104531 A1 | 12/2016 |
| JP | 11-251982 A | 9/1999 |
| JP | 2005-151053 A | 6/2005 |
| KR | 10-2011-0040557 A | 4/2011 |
| KR | 10-2012-0065816 A | 6/2012 |
| KR | 10-2015-0007016 A | 1/2015 |
| KR | 10-2019-0036105 A | 4/2019 |

\* cited by examiner

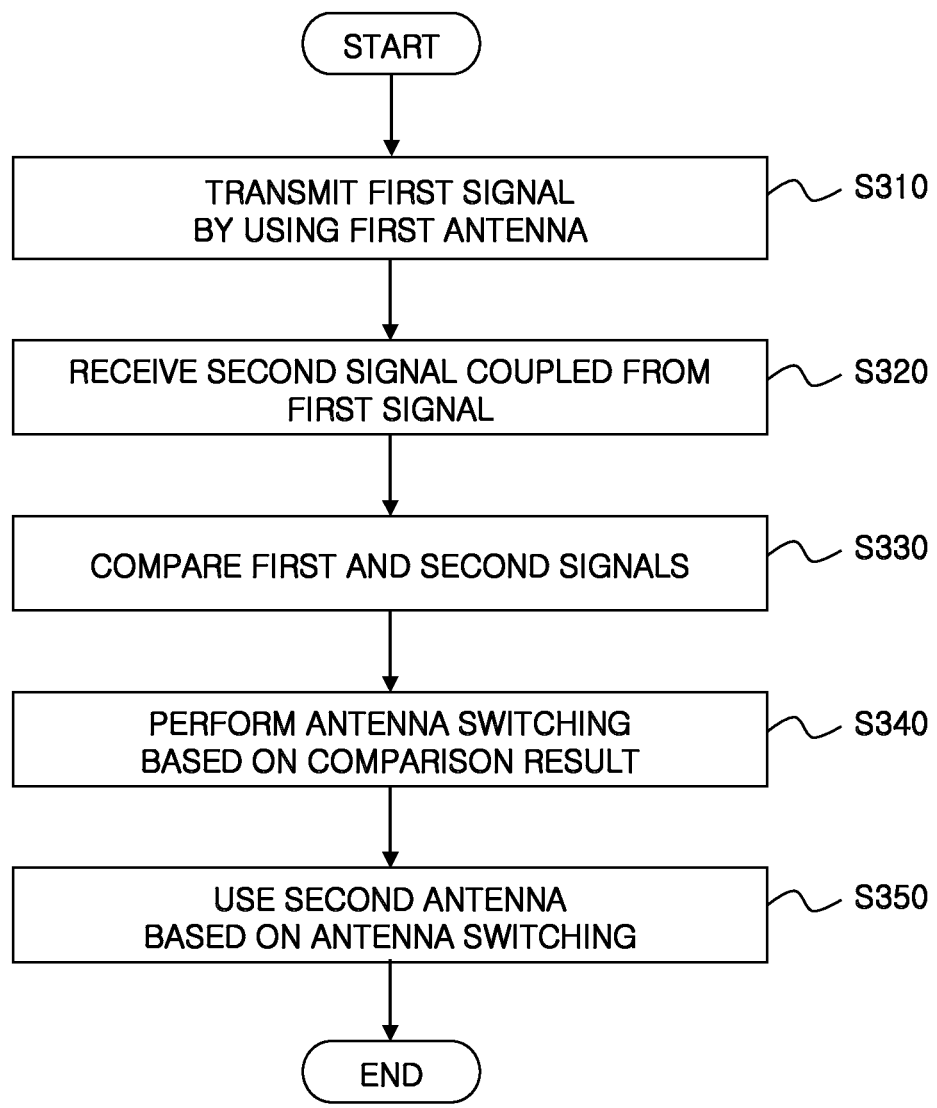

COMMUNICATION METHOD AND COMMUNICATION APPARATUS OF VEHICLE

CROSS-REFERENCE TO RELATED APPLICATION

This application is based on and claims priority under 35 U.S.C. § 119(a) of a Korean patent application number 10-2020-0017904, filed on Feb. 13, 2020, in the Korean Intellectual Property Office, the disclosure of which is incorporated by reference herein in its entirety.

BACKGROUND

1. Field

One or more embodiments of the instant disclosure generally relate to a communication method and a communication apparatus of a vehicle. More particularly, one or more embodiments of the instant disclosure relate to antenna switching technology for vehicular communication.

2. Description of Related Art

To meet the increasing demand for wireless data traffic since the commercialization of 4th generation (4G) communication systems, efforts have been made to develop advanced 5th generation (5G) or new radio (NR) communication systems. To achieve high data rates, 5G communication systems are designed to support ultra-high frequency or millimeter-wave (mmWave) bands (e.g., a 28-GHz band). To reduce path loss and increase transmission distances of data in the ultra-high frequency bands for 5G communication systems, various technologies such as beamforming, massive multiple-input and multiple-output (massive MIMO), full-dimension MIMO (FD-MIMO), array antennas, analog beamforming, and large-scale antennas are being studied.

In accordance with 5G communication, vehicular communication technology is also being developed. Vehicular communication refers to any type of communication applicable to vehicles, e.g. cars, and may be associated with various technologies embodied by connected vehicles or networked vehicles. Vehicular communication may employ various communication models such as vehicle-to-everything (V2E), vehicle-to-infrastructure (V2I), vehicle-to-vehicle (V2V), or vehicle-to-pedestrian (V2P). To improve stability and reliability of the vehicular communication, various studies are underway.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with an aspect of the disclosure, an electronic device is provided. The electronic device includes a transceiver associated with a plurality of antennas, and at least one processor configured to: transmit a first signal by using a preset first antenna of the plurality of antennas; receive a second signal coupled from the first signal; determine a comparison result by comparing the first signal and the second signal; perform antenna switching based on the comparison result; and use a second antenna based on the antenna switching. Accordingly, stability of vehicular communication may be improved. Furthermore, efficiency and reliability of vehicular communication may be improved.

In an embodiment, the at least one processor may be further configured to control the second antenna to transmit the first signal to another electronic device.

In an embodiment, the first antenna may be predetermined based on an antenna path stored in a memory, and the antenna switching may be performed by setting the second antenna as part of the antenna path.

In an embodiment, the second antenna may be temporarily set as part of the antenna path.

In an embodiment, the antenna path may be set according to a frequency band.

In an embodiment, the electronic device further includes a coupler for coupling from the first signal, the second signal may be a feedback signal of the first signal.

In an embodiment, the comparison result may be determined based on a difference between measured values of the first and second signals.

In an embodiment, the comparison result may be determined based on a difference between measured values of the first and second signals in a log scale.

In an embodiment, the antenna switching may be performed based on a number of times that the comparison result satisfies a condition.

In an embodiment, the antenna switching may be performed when the number of times that the comparison result satisfies the condition exceeds a threshold value, and the threshold value may be determined based on another number of times that the first signal and the second signal are compared.

In an embodiment, the other number of times that the first signal and the second signal are compared may be determined by comparing the first signal and the second signal for a certain period of time.

In an embodiment, the comparison result may be a first comparison result, the at least one processor may be further configured to determine a second comparison result by comparing signals received through the first and the second antennas, and the antenna switching may be performed based on the first comparison result and the second comparison result.

In an embodiment, the first comparison result may be determined based on a first threshold value and a difference between measured values of the first and second signals, the second comparison result may be determined based on a second threshold value and a difference between measured values of the signals received through the first and the second antennas, and the second threshold value may be greater than the first threshold value.

In an embodiment, the at least one processor may be further configured to determine a measurement result by measuring a voltage applied to the first antenna, and the antenna switching may be performed based on the comparison result and the measurement result.

In an embodiment, the antenna switching may be performed based on a number of times that the measurement result satisfies a condition.

In an embodiment, the comparison result may be a first comparison result, the at least one processor may be further configured to determine a second comparison result by comparing signals received through the first and the second antennas and determine a measurement result by measuring a voltage applied to the first antenna when the second comparison result satisfies a first condition, and the antenna switching may be performed when the measurement result satisfies a second condition.

In an embodiment, the electronic device may be located in a vehicle, and the at least one processor may be further configured to provide to a user of the vehicle a notification regarding the antenna switching.

In an embodiment, the plurality of antennas may include antennas pointing in different directions.

In accordance with another aspect of the disclosure, a method is provided. The method includes transmitting a first signal by using a preset first antenna of a plurality of antennas; receiving a second signal coupled from the first signal; determining a comparison result by comparing the first signal and the second signal; performing antenna switching based on the comparison result; and using a second antenna based on the antenna switching.

In accordance with another aspect of the disclosure, a non-transitory computer readable medium is provided. The non-transitory computer readable medium includes instructions, when executed by at least one processor, that cause the at least one processor to perform the method.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 3 is a flowchart of a method according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood that the terms "comprising," "including," and "having" are inclusive and therefore specify the presence of stated features, numbers, operations, components, units, or their combination, but do not preclude the presence or addition of one or more other features, numbers, operations, components, units, or their combination. In particular, numerals are to be understood as examples for the sake of clarity and are not to be construed as limiting the embodiments by the numbers set forth.

Figure 1:
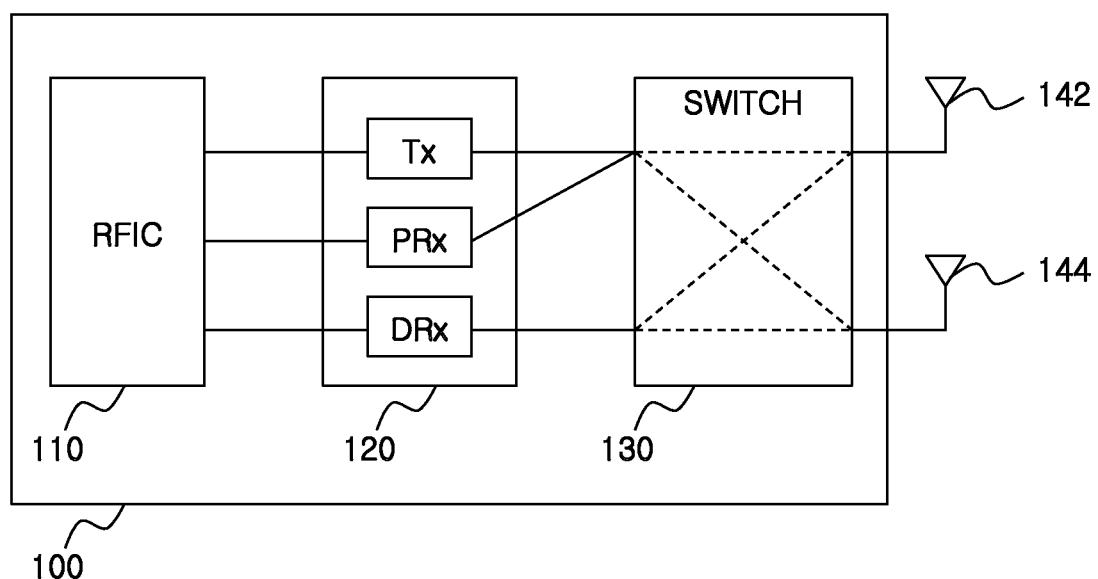
FIG. 1 is a diagram illustrating antenna switching in a mobile terminal according to an embodiment of the disclosure.

FIG. 1 is a diagram illustrating antenna switching in a mobile terminal according to an embodiment.

The mobile terminal may employ a primary antenna 142 and a diversity antenna 144 in order to mitigate fading resulting from multipath signal propagation. Antenna switching may refer to an operation of using another antenna instead of the primary antenna 142, such as the diversity antenna 144.

By employing antenna switching, the mobile terminal 100 may communicate with another terminal through an appropriate antenna selected from the primary antenna 142 and the diversity antenna 144. For example, when the signal level of the primary reception signal (PRx) is poorer than the signal level of the diversity reception signal (DRx) in the mobile terminal 100, the antenna path may be changed from the primary antenna 142 to the diversity antenna 144 using antenna switching. As another example, when the signal level of the primary reception signal (PRx) is better than the signal level of the diversity reception signal (DRx) in the mobile terminal 100, the default antenna path through the primary antenna 142 may be maintained, and antenna switching does not occur. A switch for switching between the primary antenna 142 and the diversity antenna 144 may be a single pole double throw (SPDT) switch 130.

Referring to FIG. 1, the mobile terminal 100 may include a radio-frequency integrated circuit (RFIC) 110, a transceiver 120, a switch 130, a primary antenna 142, and a diversity antenna 144. The mobile terminal 100 may be a smartphone, tablet, personal digital assistant, wearable device, media player, portable multimedia player, e-book reader, digital broadcast device, personal computer, laptop computer, micro server, navigation, MP3 player, or digital camera, but is not limited thereto.

The RFIC 110 of the mobile terminal 100 may be electrically connected to and control the transceiver 120, which includes a transmission circuit for transmission signals (Tx), a primary reception circuit for primary reception signals (PRx), and a diversity reception circuit for diversity reception signals (DRx). The RFIC 110 may control the switch 130 to select the appropriate antenna from the primary antenna 142 and the diversity antenna 144 to communicate with other terminals.

Various methods may be used as the reception antenna diversity technology, such as equal gain combining (EGC), maximal ratio combining (MRC), space-time block code (STBC), space-frequency block code (SFBC), and/or multi-input multi-output (MIMO). The mobile terminal 100 may operate the diversity function in spite of the increase of power consumption when call drop is expected when the antennas are in a weak electric field, or when a signal requiring high quality of service (QoS) is received. The diversity function may be terminated to save battery life when the quality of the electric field is good or high QoS is not required. When the signal-to-noise ratio (SNR) is decreased in a certain antenna, but another antenna has higher SNR, the other antenna may be used after antenna switching to reduce reception packet loss.

According to an embodiment, antenna switching may be performed based on the transmission signal as well as the reception signal, and stability of vehicular communication may be improved by performing antenna switching based on the transmission signal. Antenna switching according to the transmission signal will be explained later in reference to FIGS. 2A, 2B, 3, 4, 5, 6, and 7.

According to an embodiment, antenna switching may be performed based on comparing the transmission signal and a feedback signal coupled from the transmission signal, which will be explained later in reference to FIG. 4.

In an embodiment, antenna switching may be performed between backup antennas as well as the primary antenna 142 and the diversity antenna 144, which will be explained later in reference to FIG. 4.

In an embodiment, antenna switching may be performed based on checking the reception signal, the transmission signal, and voltages applied to antennas, which will be explained later in reference to FIG. 5.

Figure 2A:
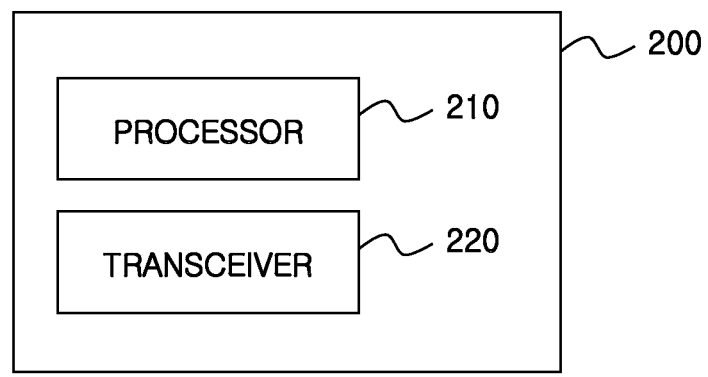
FIG. 2A is a block diagram of an electronic device according to an embodiment of the disclosure.

FIG. 2A is a block diagram of an electronic device according to an embodiment.

The electronic device 200 may be installed in a vehicle. The electronic device 200 may be a communication module located in the vehicle or a part of the communication module. Referring to FIG. 2A, the electronic device 200 may include a processor 210 and a transceiver 220. The electronic device 200 may be a telematic control unit (TCU) of the vehicle or may be included in the TCU.

The transceiver 220 may transmit or receive signals to or from a base station or other terminals. The transceiver 220 may receive a signal through a wireless channel and provide the signal to the processor 210, and transmit a signal output from the processor 210, through a wireless channel. The transceiver 220 may be separated into a transmitter and a receiver. The transmitter may up-convert the frequency of the signal to be transmitted and amplify the signal to be transmitted. The receiver may low-noise amplify a received signal and down-convert the frequency of the received signal. The transceiver 220 may play the roles of both the transmitter and the receiver.

The processor 210 may control each component of the electronic device 200, such as the transceiver 220, to perform operations according to one or more embodiments disclosed herein. The processor 210 or software running by the processor 210 may perform operations or steps of methods described or illustrated herein to provide functionality described or illustrated herein. The processor 210 may include one or more processors. The one or more processors 210 may include a general-purpose processor or any suitable type of processing circuitry, such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors 210 may control input data to be processed according to predefined operation rules or an AI model stored in a memory. When the one or more processors 210 are a dedicated AI processor 210, the dedicated AI processor 210 may be designed with a hardware structure specialized for processing a specific AI model. In addition, it would be recognized that when a general purpose computer processor accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The electronic device 200 may further include the memory. Software modules of the electronic device 200, such as program modules, may be stored in the memory as a collection of instructions, the instructions may be executed by the processor to perform corresponding functions. A program for process and control of the processor 210, and input or output of data may be stored in the memory. Programs stored in the memory may be broken down into a plurality of modules.

The electronic device 200 may be implemented by more or fewer components than the components described above. The processor 210 may be configured to perform operations of methods according to certain embodiments disclosed herein. Operations performed by the processor 210 according to an embodiment will be explained later in reference to FIG. 3.

Figure 2B:
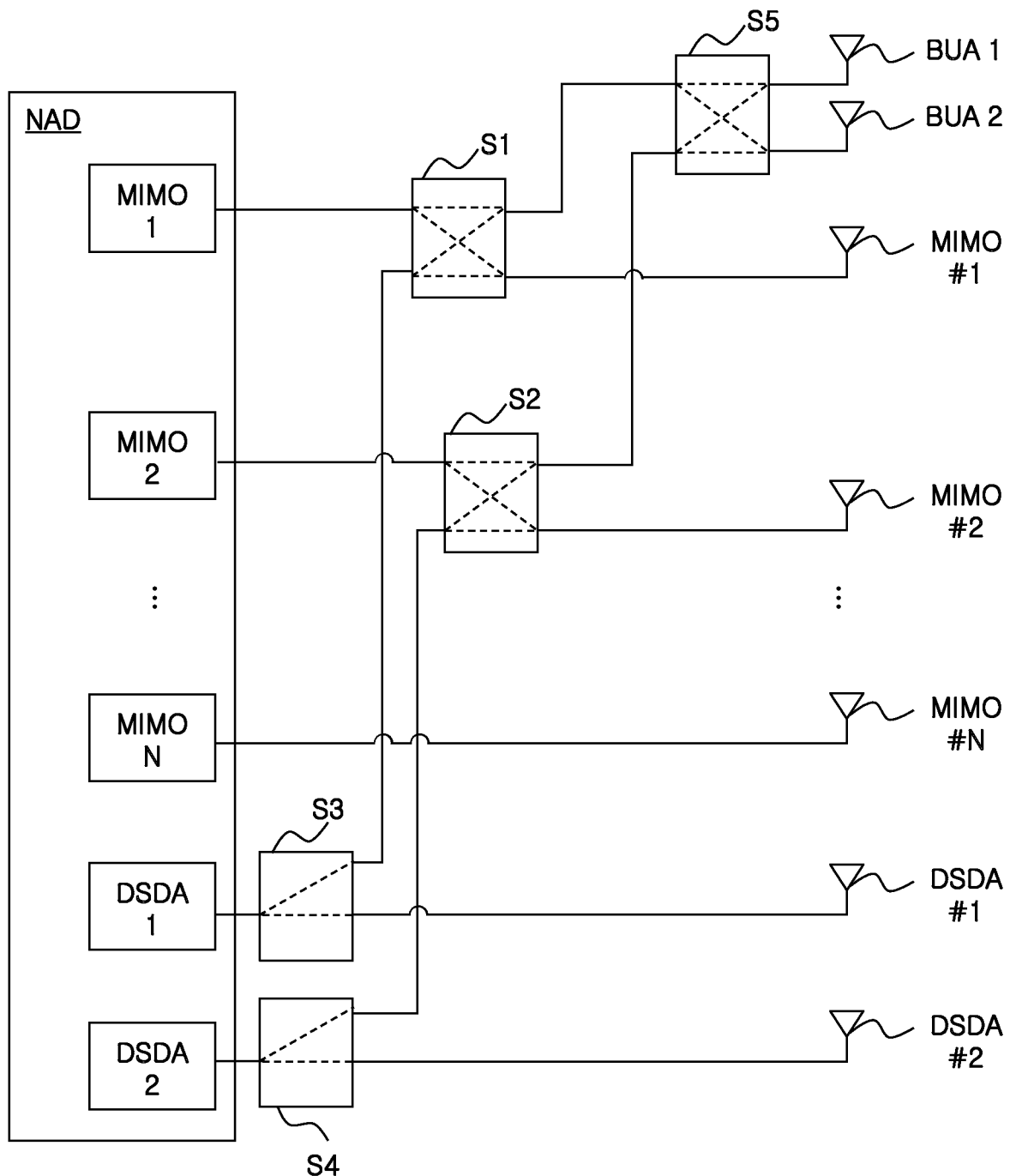
FIG. 2B is a diagram illustrating antenna switching in an electronic device according to an embodiment of the disclosure.

FIG. 2B is a diagram illustrating antenna switching in an electronic device according to an embodiment.

Referring to FIG. 2B, the electronic device 200 may be referred to as a network access device (NAD). The NAD may include various network interfaces for communication, such as one or more MIMO interfaces (MIMO 1, MIMO 2, . . . , MIMO N), one or more dual subscriber identification module (SIM) dual active (DSDA) interfaces (DSDA 1 and DSDA 2), but is not limited thereto. The NAD may transmit and receive signals through antennas corresponding to the interfaces (MIMO #1, MIMO #2, . . . , MIMO #N, DSDA #1, and DSDA #2). Furthermore, the NAD may transmit and receive signals through backup antennas (BUA 1 and BUA 2).

In an embodiment, when a transmission signal (Tx) is not transmitted with the intended power, the communication path may be changed to transmit Tx with the intended power.

In an embodiment, when imbalance between a primary reception signal (PRx) and a diversity reception signal (DRx) is above a certain level, the communication path may be changed to reduce the imbalance so that it is below the certain level. The communication path may be changed by using the switches S1, S2, S3, S4, and S5.

The communication path may be changed by antenna switching. According to an embodiment, when the communication path is changed, an interface of the NAD may transmit and receive signals through a different antenna instead of the antenna corresponding to the interface. For example, referring to FIG. 2B, a DSDA interface (DSDA 1), which transmits and receives signals through an antenna (DSDA #1), may start to transmit and receive signals through a backup antenna (BUA 1 or BUA 2) after its communication path is changed by the switch S3.

Backup antennas (BUA 1 and BUA 2) may be internal backup antennas of the electronic device 200 or external backup antennas, but are not limited thereto. An internal backup antenna may be located on a base substrate of the electronic device 200. An external backup antenna may be located outside of the electronic device 200, such as in the vehicle in which the electronic device 200 is mounted.

In an embodiment, signals transmitted and received through the backup antennas (BUA 1 and BUA 2) may pass through at least two switches. For example, referring to FIG. 2B, a DSDA interface (DSDA 1) may transmit and receive signals through a backup antenna (BUA 1 or BUA 2) by passing through three switches (S3, S1, and S5). As another example, a MIMO interface (MIMO 1) may transmit and receive signals through a backup antenna (BUA 1 or BUA 2) by passing through two switches (S1 and S5). In an embodiment, the minimum number of switches through which signals transmitted and received through backup antennas pass may be proportional to the number of the backup antennas. FIG. 2B illustrates two backup antennas (BUA 1 and BUA 2), but is not limited thereto, and more backup antennas may be used.

FIG. 3 is a flowchart of a method according to an embodiment.

In an embodiment, a first antenna may be set as part of the default antenna path in an electronic device. Accordingly, the electronic device may communicate with another device through the first antenna. The default antenna path may be stored in a memory of the electronic device. In an embodiment, various default antenna paths may be set according to various frequency bands, and thus different default antenna paths may be set for certain frequency bands. For example, a default antenna path of a first frequency band may be set for a first antenna, and a default antenna path of a second frequency band may be set for a second antenna. A primary antenna path and a secondary antenna path may be set for a certain frequency band, but are not limited thereto, and three or more antenna paths may be set for a certain frequency band.

It should be understood that, although the terms "first," "second," etc. may be used herein to describe various elements, and these elements should not be limited by these terms. Unless indicated otherwise, these terms are only used to distinguish one element from another element. Therefore, a first element may be termed as a second element or vice versa within the technical scope of an exemplary embodiment.

When the first antenna is used to transmit a signal and the communication quality the first antenna is worse than another antenna, it may be beneficial for the electronic device to use the other antenna instead of the first antenna. When the first antenna is used to transmit a signal and the communication quality of the first antenna is better than another antenna, it may be beneficial for the electronic device to keep using the first antenna. According to an embodiment, the electronic device may perform operations S310, S320, S330, S340, S350, and S360, any their related operations for antenna switching.

In operation S310, a first signal may be transmitted by using a first antenna. The first signal may be referred to as Tx signal. The first signal may be transmitted by using the first antenna, which is set as part of the default antenna path.

In operation S320, a second signal coupled from the first signal may be received. The second signal is a feedback signal coupled from the first signal. A coupler for coupling from the first signal will be explained later in reference to FIG. 4.

In an embodiment, transmission of the first signal and reception of the second signal may be performed at a certain interval. The interval may be predetermined, such as 0.1 seconds, but is not limited thereto. The transmission of the first signal and the reception of the second signal may be performed, at this interval, for a certain period of time. For example, the transmission of the first signal and the reception of the second signal may be performed for 2 seconds with an interval of 0.1 seconds. The transmission of the first signal and the reception of the second signal may be performed, at an interval, for a certain number of times. For example, the transmission of the first signal and the reception of the second signal may be performed 20 times with an interval of 0.1 seconds.

In operation S330, the first signal and the second signal may be compared. A comparison result may be determined by comparing the first and second signals. In an embodiment, powers of the first and the second signals may be compared. The first and second signals may be compared in a log scale. For example, the difference between a power level of the first signal and the power level of the second signal may be determined, but is not limited thereto. Various parameters may be compared in various scales.

In an embodiment, the comparison of the first and second signals may be performed at a certain interval, or performed, at an interval for a certain period of time, or performed at an interval for a certain number of times.

In operation S340, antenna switching may be performed based on the comparison result. In an embodiment, antenna switching may be performed when the comparison result satisfies a certain condition. For example, antenna switching may be performed when the difference between power levels of the first and second signals is equal to or greater than a threshold value, such as, 1 dB, but is not limited thereto. Antenna switching may be performed based on various conditions. For example, the threshold value may be set differently depending on the various conditions. Antenna switching may be performed when the difference between the first and second signals exceeds the threshold value. It is described that antenna switching is performed when the comparison result of the two signals satisfies the condition, such as a first condition, and antenna switching is not performed when the comparison result does not satisfy the first condition. However, antenna switching may be performed when the comparison result of the two signals does not satisfy another condition, such as a second condition that does not intersect the first condition, and antenna switching may be not performed when the comparison result satisfies the second condition.

In an embodiment, antenna switching may be performed based on the number of times that the difference between power levels of the first and second signals is determined to as being equal to or greater than a threshold value. The difference between the transmission signal and the feedback signal coupled from the transmission signal is affected by various factors. Therefore, it may be observed that the difference of the first and second signals is relatively large even though the first antenna actually has no problem. If antenna switching is performed even though the first antenna actually has no problem, the efficiency of communication may be reduced. According to an embodiment, antenna switching may be performed based on the number of times that the difference between the two signals exceeds a threshold value, thereby, preventing excessive antenna switching. The number of times that the difference between the two signals exceeds the threshold value may be a predetermined value, but is not limited thereto. For example, the number of times that the difference between the two signals exceeds the threshold value may be variable and adaptive to certain situations.

In operation S350, a second antenna may be used after the antenna switching. It may be implemented that the processor of the electronic device communicates with another device by using the second antenna after performing the antenna switching. In an embodiment, the second antenna may be set as part of the default antenna path instead of the first antenna. After the default antenna path is changed, the second antenna may be selected as the default antenna path for the electronic device to communicate through the second antenna when starting up the electronic device. In an embodiment, the first signal may be transmitted to the other device through the second antenna. That is, a target signal to be transmitted to the other device may be also used as a test signal (the first signal) in determining whether to perform antenna switching. In an embodiment, the target signal may be identical to the test signal. For example, the target signal may be used in determining whether to perform antenna switching while the target signal is being transmitted to the other device. Here, the target signal may be used in determining whether to perform antenna switching while the target signal is being transmitted to the other device through the first antenna, or the second antenna after performing antenna switching. In an embodiment, the target signal may be not identical to the test signal. For example, the test signal may be used in determining whether to perform antenna switching, and then the target signal that is different from the test signal may be transmitted to the other device through the first antenna, or the second antenna after performing antenna switching.

According to an embodiment, a Tx signal may be transmitted through the second antenna and a feedback signal coupled from the Tx signal may be received, and then antenna switching may be employed to use a third antenna. The third antenna may be the first antenna. Or the third antenna may be an antenna other than the first and second antennas.

In an embodiment, the electronic device may store comparison result for the various antennas, and set an antenna having the best quality as part of the default antenna path, based on the comparison result. For example, an antenna showing the least difference between the Tx signal and the feedback signal coupled from the Tx signal may be selected from the antennas and set as part of the default antenna path.

Figure 4:
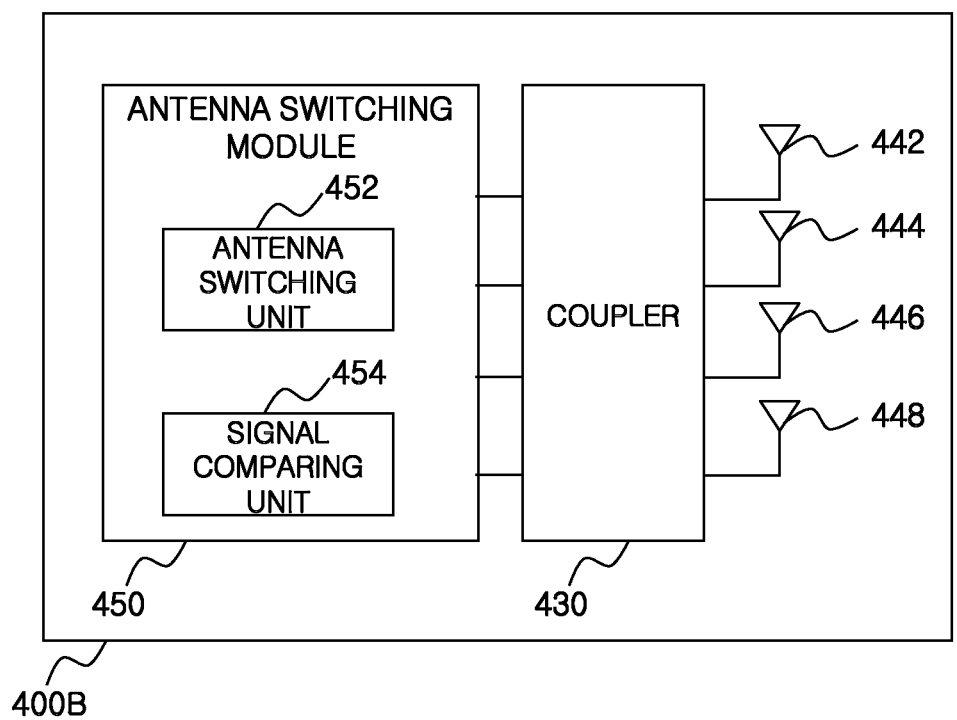
FIG. 4 is a block diagram of an electronic device including a coupler according to an embodiment of the disclosure.

FIG. 4 is a block diagram of an electronic device including a coupler according to an embodiment.

Referring to FIG. 4, the electronic device 400 may include a coupler 430, a plurality of antennas 442, 444, 446, and 448, and an antenna switching module 450. The antenna switching module 450 in part may be embodied by software modules, and the software modules may be executed by at least one processor to provide functionality of the antenna switching module 450. Meanwhile, the software modules may be stored in a memory of the electronic device as a collection of instructions, and the instructions stored in the memory may be executed by a processor the electronic device 400. The antenna switching module 450 may be embodied by a hardware module, or a combination of a hardware module and software module. FIG. 4 illustrates that the electronic device 400 includes the coupler 430, the plurality of antennas 442, 444, 446, and 448, and the antenna switching module 450, but is not limited thereto. The electronic device 400 may include more or fewer components than the components described above. For example, the electronic device 400 may include a processor and a transceiver as illustrated in FIG. 2A.

Referring to FIG. 4, the coupler 430 may be located between the antenna switching module 450, and the plurality of antennas 442, 444, 446, and 448. The coupler 430 may transmit power from a signal of a certain line to another line using coupling. The coupler 430 may be configured for a second signal coupled from a first signal to have a certain power ratio to the first signal. Accordingly, power levels of the first and the second signals may be compared to determine that whether a signal is transmitted with the intended power level through a certain antenna, such as a first antenna 442. According to an embodiment, antenna switching may be performed based on comparing a transmission signal and a feedback signal coupled from the transmission signal. The feedback signal is detected by the coupler 430.

A signal comparing unit 454 may compare the first and second signals to determine a comparison result. An antenna switching unit 452 may perform antenna switching based on the comparison result of the first and second signals. For example, when a signal is not being transmitted at the intended power level through the first antenna, or when the signal is being transmitted at a power level lower than the intended power level, the antenna switching unit 452 may perform antenna switching. By employing antenna switching, the electronic device 400 may transmit and receive signals through a second antenna 444, 446, or 448 instead of the first antenna 442.

According to an embodiment, antenna switching may be performed between backup antennas as well as a primary antenna 442 and a diversity antenna 444. For example, referring to FIG. 4, the plurality of antennas 442, 444, 446, and 448 may include the primary antenna 442, the diversity antenna 444, and a first backup antenna 446, and a second backup antenna 448. Therefore, the antenna which is the most beneficial for transmission may be selected from the various antennas 442, 444, 446, and 448 and used to communicate, thereby, improving the efficiency of vehicular communication. FIG. 4 illustrates four antennas 442, 444, 446, and 448, but the number of antennas is not limited thereto. Locations of the antennas 442, 444, 446, and 448 will be explained later by referring to FIG. 10.

Referring to FIG. 4, the antenna switching module 450 may include the antenna switching unit 452 and the signal comparing unit 454. The antenna switching module 450 may further include additional components, and/or the antenna switching unit 452 and the signal comparing unit 454 may be integrated into a single component. In the disclosure, modules or components of the antenna switching module 450 are named to distinctively explain their operations which are performed in the antenna switching module 450 or the electronic device 200. Thus, it should be understood that such operations are performed according to a disclosed embodiment and should not be interpreted as limiting the role or the function of the modules or components. For example, an operation which is described herein as being performed by the antenna switching module 450 may be performed by another module of the electronic device 400, and an operation which is described herein as being performed by interaction between two or more components of the antenna switching module 450 may be performed by a single component of the antenna switching module 450. Furthermore, an operation which is described herein as being performed by the antenna switching module 450 may be performed at or with another component of the electronic device 400 to provide substantially same functionality.

Figure 5:
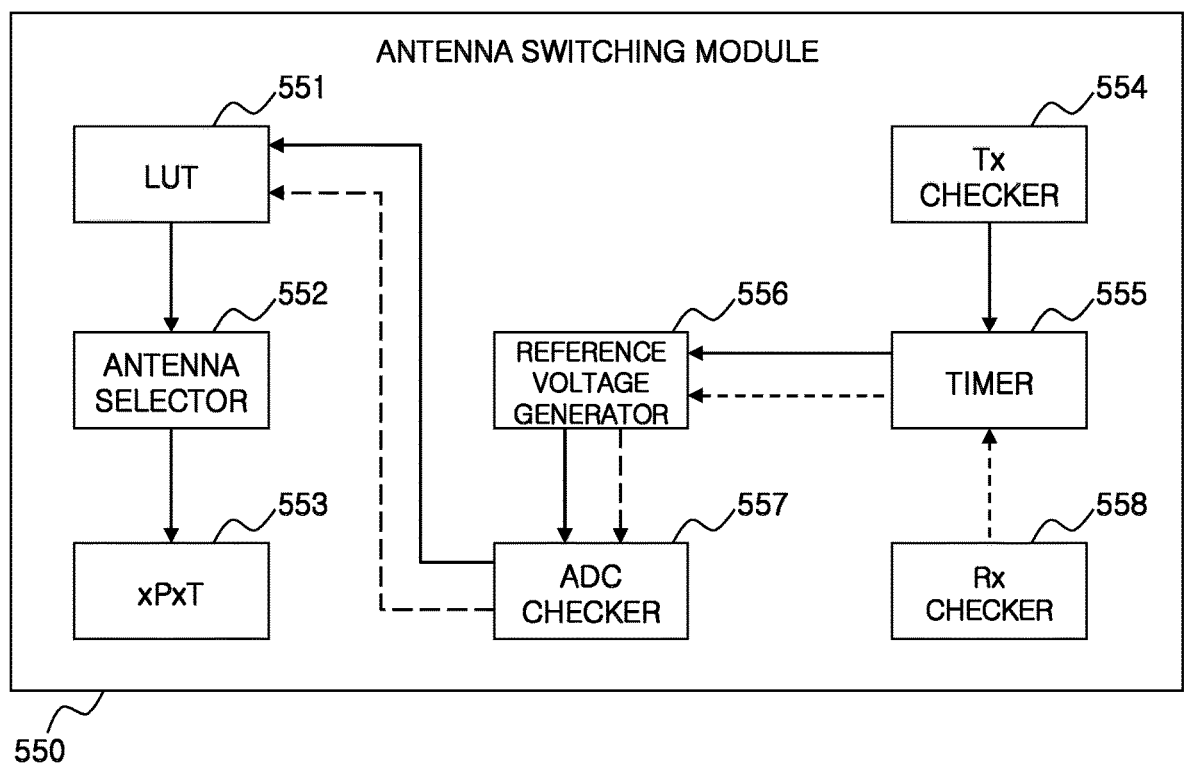
FIG. 5 is a block diagram of an antenna switching module according to an embodiment of the disclosure.

FIG. 5 is a block diagram of an antenna switching module according to an embodiment.

Referring to FIG. 5, an antenna switching module 550 may include a look-up table (LUT) 551, an antenna selector 552, an x Pole x Through (xPxT) switch 553, a Tx checker 554, a timer 555, an Rx checker 558, a reference voltage generator 556, and an analog to digital converter (ADC) checker 557. It should be understood that reference numerals for the units of the antenna switching module 550 are only used to distinguish one unit from another unit, and not used to limit the order of operations performed by the units.

Operations of the antenna switching module will be explained by further referring to FIGS. 6, 7, 8, and 9.

Figure 6:
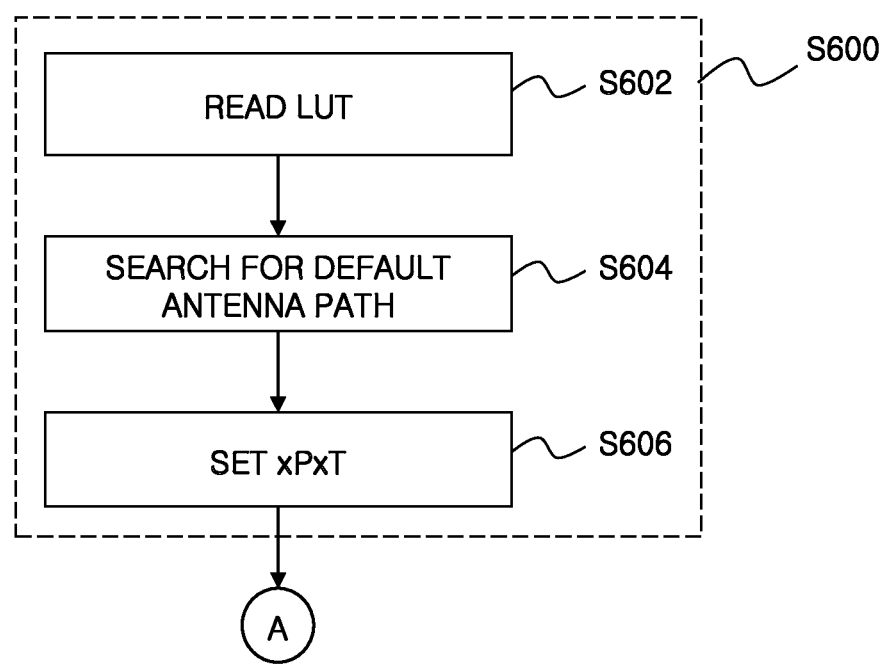
FIG. 6 is a flowchart of a communication preparation method according to an embodiment of the disclosure.

FIG. 6 is a flowchart of a communication preparation method according to an embodiment.

Referring to FIG. 6, the communication preparation method may include an initial process S600 performed when starting up the electronic device, a terminal, or a vehicle in which the electronic device is mounted.

In operation S602, the LUT 551 may be read. The LUT 551 may be stored in a memory of the electronic device. The antenna switching module 550 or the electronic device may read the LUT 551 to search for information stored in the LUT 551.

In operation S604, a default antenna path may be found. The default antenna path may be found in the LUT 551 by searching the information stored in the LUT 551. The antenna selector 552 of the antenna switching module 550 may search the LUT 551 for the default antenna path.

In operation S606, the xPxT switch 553 may be set to use the antenna which is indicated by the found antenna path. The antenna selector 552 of the antenna switching module 550 may select the antenna which is indicated by the antenna path found as a result of the search, and the selected antenna may be used for data communication. 'x' of the xPxT switch 553 may be determined according to the numbers of inputs and outputs in MIMO.

The antenna which is set as part of the default antenna path may be selected by the antenna selector 552, and signals may be transmitted through the selected antenna from the electronic device.

The antenna path may be stored in the memory of the electronic device. The antenna path may be found in the LUT 551 by searching the information stored in the LUT 551. The antenna path may be set according to a frequency band. The LUT 551 may include a primary antenna path and a secondary antenna path for each frequency band, but is not limited thereto. The LUT 551 may include three or more antenna paths for each frequency band.

Figure 7:
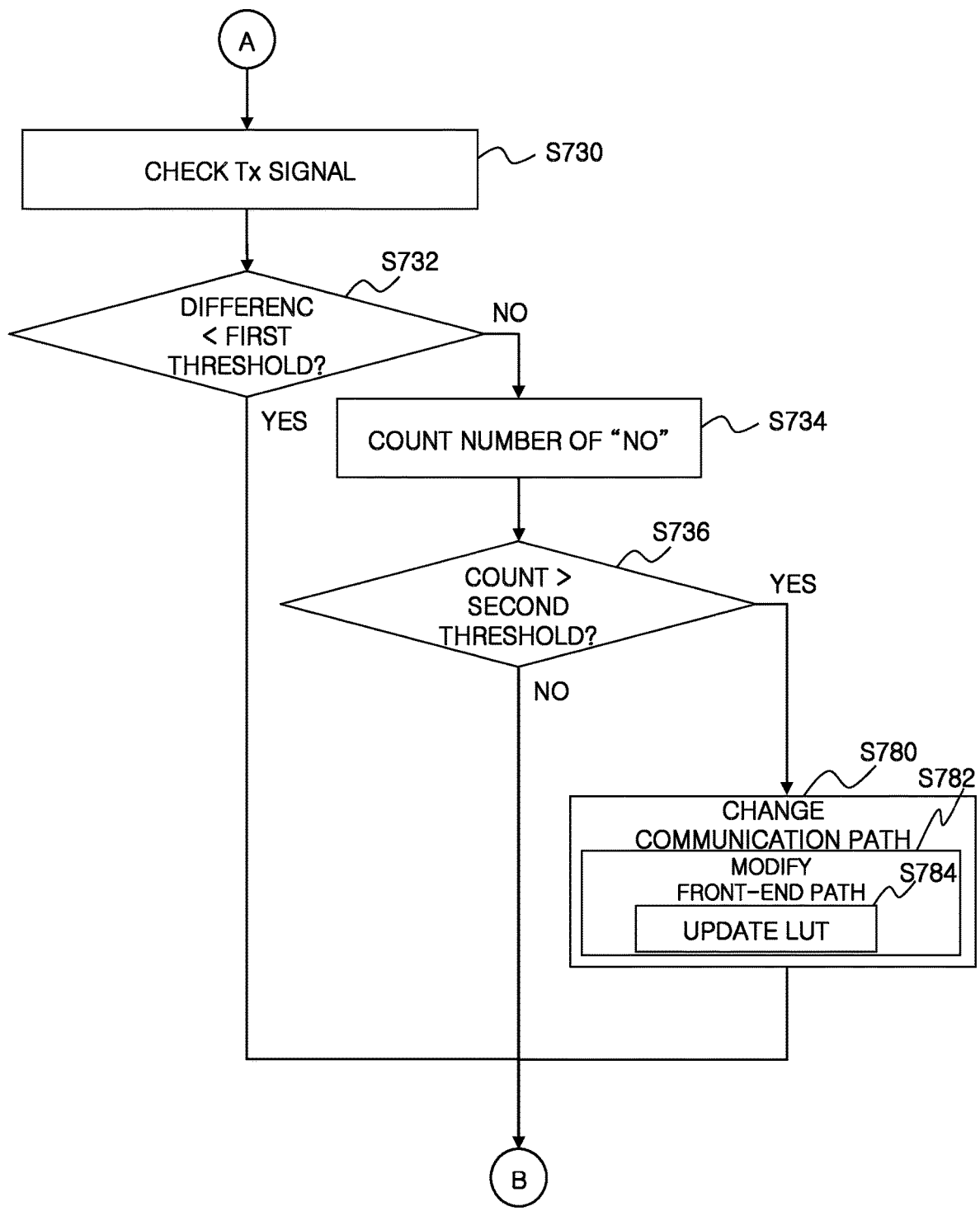
FIG. 7 is a flowchart of a method of performing antenna switching based on a transmission signal according to an embodiment of the disclosure.

FIG. 7 is a flowchart of a method of performing antenna switching based on a transmission signal according to an embodiment.

The method of performing antenna switching based on a transmission signal illustrated in FIG. 7 may be performed after the communication preparation method illustrated in FIG. 6 is performed, but is not limited thereto. For example, the method of performing antenna switching based on a reception signal illustrated in FIG. 8 may be performed after the communication preparation method illustrated in FIG. 6 is performed.

In operation S730, Tx signals may be checked. The check of Tx signals may include comparing the intended power of a transmission signal and the power of a signal coupled from the transmission signal. The check of Tx signals may be performed by the Tx checker 554.

In operation S732, it may be determined that the difference between the two signals (the transmission signal and its coupled signal) is less than a first threshold value. The difference between the two signals may be a difference between the power levels of the two signals. When the difference between the transmission signal and its coupled signal is less than the first threshold value, it may be assumed that the signal is being transmitted at the intended power level from the electronic device, and the Tx signal check process may be terminated. When the difference between the two signals is equal to or greater than the first threshold value, the number of times that the difference between the two signals is equal to or greater than the first threshold value may be counted in operation S734. In an embodiment, the check of Tx signals may be performed a certain number of times, and the number of times that the difference between the two signals is equal to or greater than the first threshold value may be counted when the Tx signal check is performed for the certain number of times. For example, Tx signals may be checked 20 times. In an embodiment, the check of Tx signals may be performed for a certain period of time, and the number of times that the difference between the two signals is equal to or greater than the first threshold value may be counted for the certain period of time. For example, Tx signals may be checked for 2 seconds. In an embodiment, the check of Tx signals may be performed at a certain interval. For example, Tx signals may be checked at an interval of 100 ms.

In operation S734, the number of times that the difference between the two signals is equal to or greater than the first threshold value may be counted by the timer 555. In an embodiment, the first threshold value may be a certain power level, such as 1 dB, but is not limited thereto. For example, the first threshold value may be a value between 1 dB and 3 dB. In an embodiment, the first threshold value may be different from a third threshold value which will be explained later. For example, the first threshold value may be less than the third threshold value. When the difference between the transmission signal and its coupled signal is greater than the first threshold value, it may be assumed that the signal is being transmitted at a power level lower than the intended power level from the electronic device, which may cause a problem even when the difference between Rx signals is subtle. Therefore, the check of Tx signals may be performed based on tighter standard than check of Rx signals. For example, the first threshold value used for the check of Tx signals may be less than the third threshold value used for the check of Rx signals. The first threshold value and the third threshold value may be predetermined values, but is not limited thereto. The first threshold value and the third threshold value may be variable and adaptive to various situations. For example, the first threshold value and/or the third threshold value may be changed according to the current location at which the electronic device is mounted, the change of location of the vehicle, the speed of the vehicle, etc. Accordingly, antenna switching may be performed appropriately according to a situation of the electronic device or its user. For example, the first threshold value and/or the third threshold value for a stopped vehicle may be less than the first threshold value and/or the third threshold value for a moving vehicle.

In operation S736, it may be determined that the counted number exceeds a second threshold value. The second threshold value may be a predetermined value, such as 10 times, but is not limited thereto. The second threshold value may be variable and adaptive to various situations. When the counted number exceeds the second threshold value, the communication path may be changed in operation S780. For example, a front-end path may be modified in operation S782. The front-end path may refer to a path from a processor to an element before an antenna. The LUT 551 may be updated in operation S784 to set the modified front-end path as the default communication path. In an embodiment, an antenna path may be modified in operation S782, and the LUT 551 may be updated to set the modified antenna path as the default communication path. In an embodiment, modification of the antenna path may be temporary, but the default antenna path may be modified by updating the LUT 551.

Figure 8:
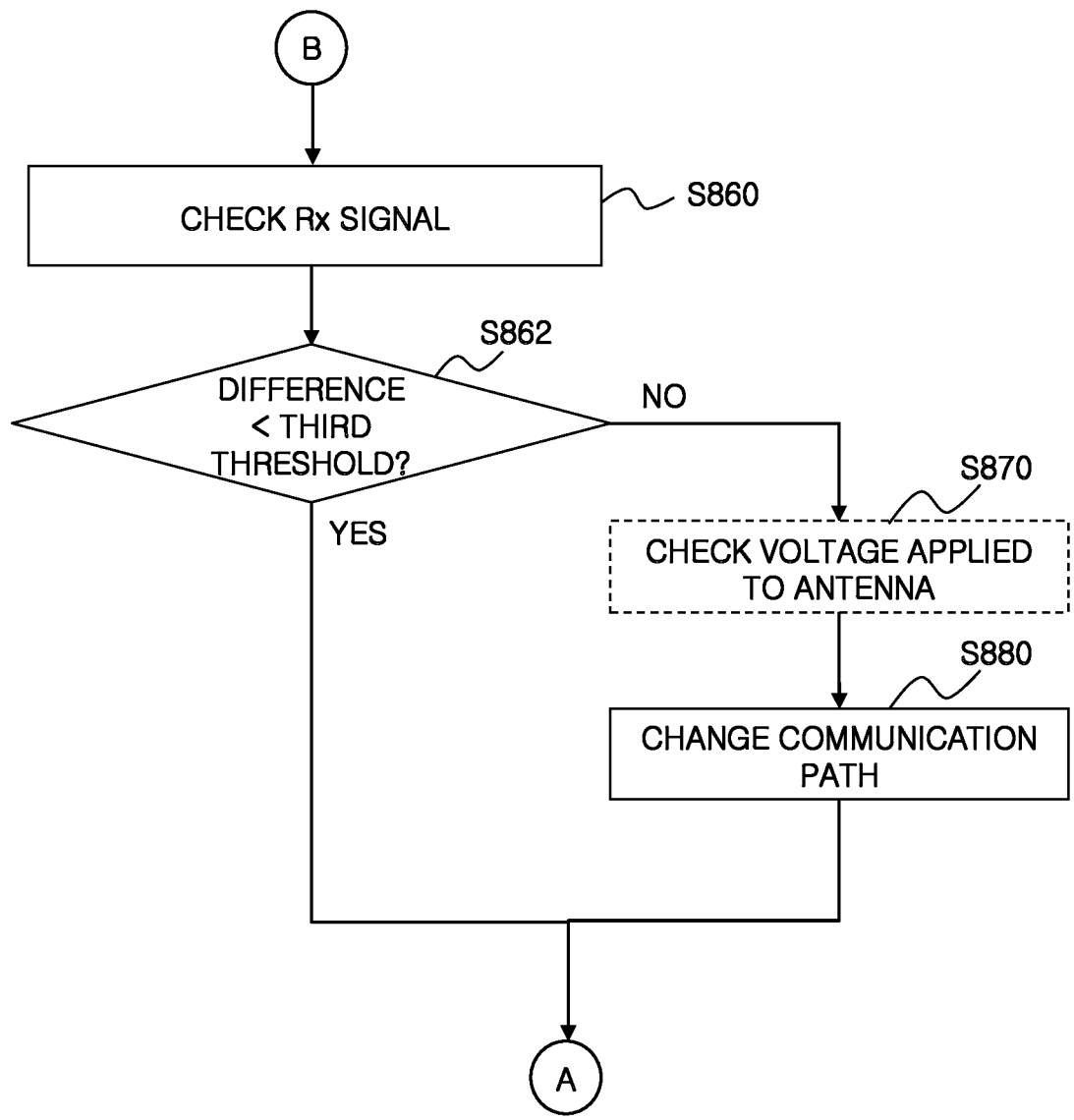
FIG. 8 is a flowchart of a method of performing antenna switching based on a reception signal according to an embodiment of the disclosure.

FIG. 8 is a flowchart of a method of performing antenna switching based on a reception signal according to an embodiment.

The method of performing antenna switching based on a reception signal illustrated in FIG. 8 may be performed after the method of performing antenna switching based on a transmission signal illustrated in FIG. 7, but is not limited thereto. For example, the method of performing antenna switching based on a reception signal illustrated in FIG. 8 may be performed before the method of performing antenna switching based on a transmission signal illustrated in FIG. 7.

In operation S860, Rx signals may be checked. For example, a primary reception signal (PRx) and a diversity reception signal (DRx) may be compared to determine a difference between PRx and DRx. Check of Rx signals may include an operation of comparing powers of PRx and DRx. The check of Rx signals may be performed by the Rx checker 558.

In operation S862, it may be determined that the difference between the two signals is less than the third threshold value. The difference between the two signals may be a difference between power levels of the two signals. When the difference between PRx and DRx is less than the third threshold value, it may be assumed that the signal is being received well at the electronic device, and the Rx signal check process may be terminated. When the difference between the two signals is equal to or greater than the third threshold value, a communication path may be changed in operation S880. The third threshold value may be a certain power level, such as, 5 dB, but is not limited thereto. For example, the third threshold value may be a value between 5 dB and 10 dB. The third threshold value may be different from the first threshold value. For example, the third threshold value may be greater than the first threshold value. Operations S870 and S880 will be explained later in more detail in reference to FIG. 9. In an embodiment, although not shown in FIG. 8, when it is determined that the difference between the two signals is equal to or greater than the third threshold value in operation S862, the number of times that the difference between the two signals is equal to or greater than the third threshold value may be counted. Operation S880 may be executed when the counted number is equal to or greater than a certain threshold value. The number of times that the difference between the two signals is equal to or greater than the third threshold value may be counted by the timer 555.

In an embodiment, a voltage applied to an antenna may be checked in operation S870 before the communication path is changed in operation S880. For example, when the difference between PRx and DRx is equal to or greater than the third threshold value, the voltage applied to the antenna may be checked in operation S870, and the communication path may be changed in S880 according to a result of the check in S870. Operations S870 and S880 is explained below in reference to FIG. 9.

Figure 9:
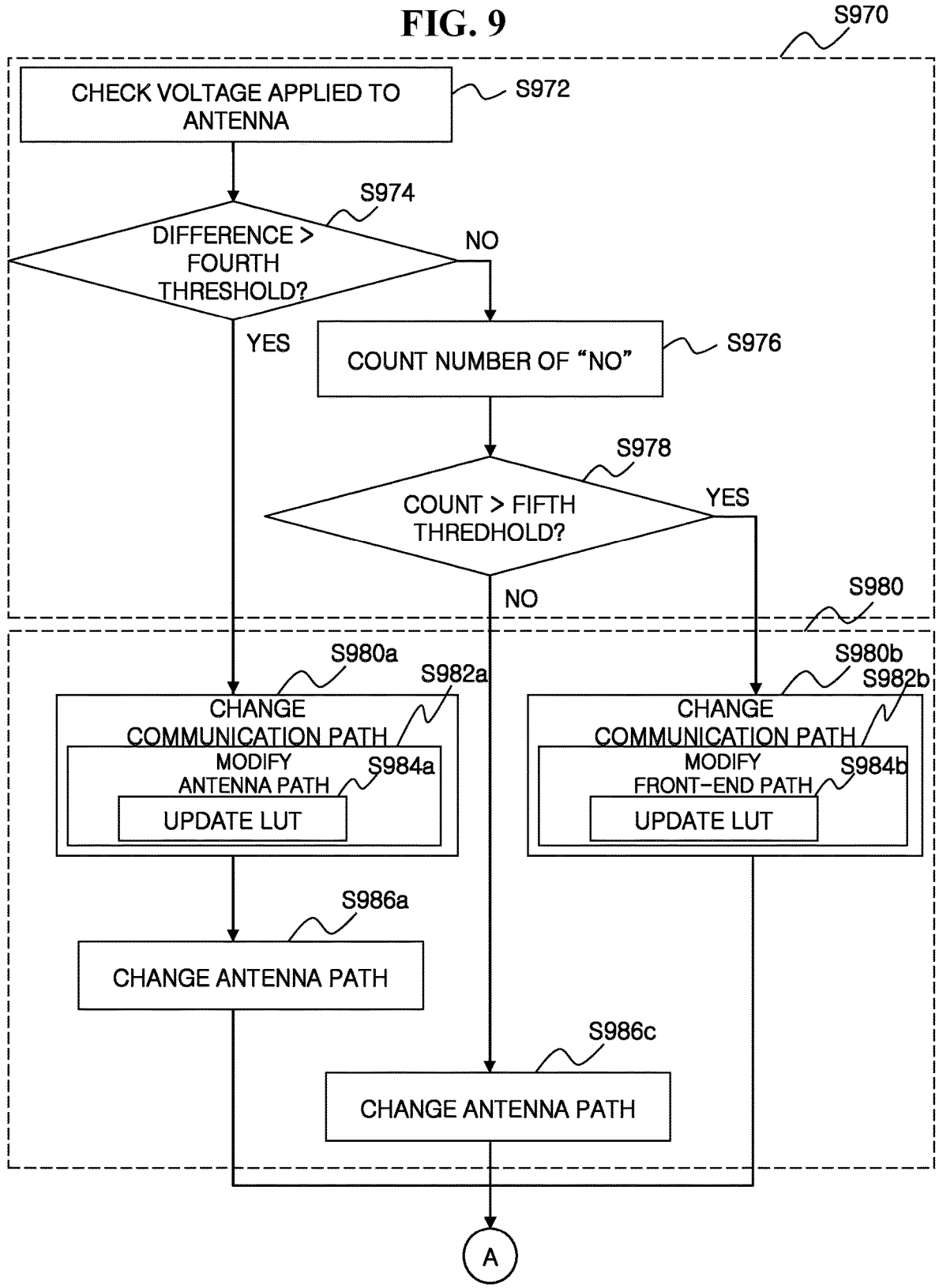
FIG. 9 is a flowchart of a method of performing antenna switching based on a voltage applied to an antenna according to an embodiment of the disclosure.

FIG. 9 is a flowchart of a method of performing antenna switching based on a voltage applied to an antenna according to an embodiment.

Operations S970 and S980 of FIG. 9 correspond to operations S870 and S880, respectively.

In operation S972, a voltage applied to an antenna may be checked. The voltage may be measured by an analog to digital converter (ADC). For example, an actual voltage measured at an antenna and a reference voltage which is intended to be applied to the antenna may be compared. The reference voltage may be generated by the reference voltage generator 556, and comparison of two voltages may be performed by the ADC checker 557.

It may be determined that a difference between the actual voltage measured at an antenna and the reference voltage which is intended to be applied to the antenna is greater than a fourth threshold value. The fourth threshold value may be a certain voltage. When the difference between the two signals is greater than the fourth threshold value, it may be assumed that the antenna is broken because the length of a communication path, such as the length of the antenna path has varied. In operation 980a, the communication path may be changed. For example, the antenna path may be modified in operation S982a. The LUT 551 may be updated in operation S984a to set the modified antenna path as the default path. The antenna path may be changed in operation S986a according to the modified antenna path in the LUT 551. That is, antenna switching may be performed.

When the difference between the two signals is equal to or less than the fourth threshold value, the number of times that the difference between the two signals is equal to or less than the fourth threshold value may be counted in operation S976. The number of times that the difference between the two signals is equal to or less than the fourth threshold value may be counted by the timer 555. In operation S978, it may be determined that the counted number exceeds a fifth threshold value. The fifth threshold value may be 10 times, but is not limited thereto. When the counted number exceeds the fifth threshold value, the communication path may be changed in operation S980b. For example, the front-end path may be modified in operation S982b. The LUT 551 may be updated in operation S984b to set the modified front-end path as the default communication path.

When the counted number does not exceed the fifth threshold value, antenna switching may be performed temporarily in operation S986c. According to an embodiment, the original antenna path may be recovered when the situation of the electronic device or its user changes.

Figure 10:
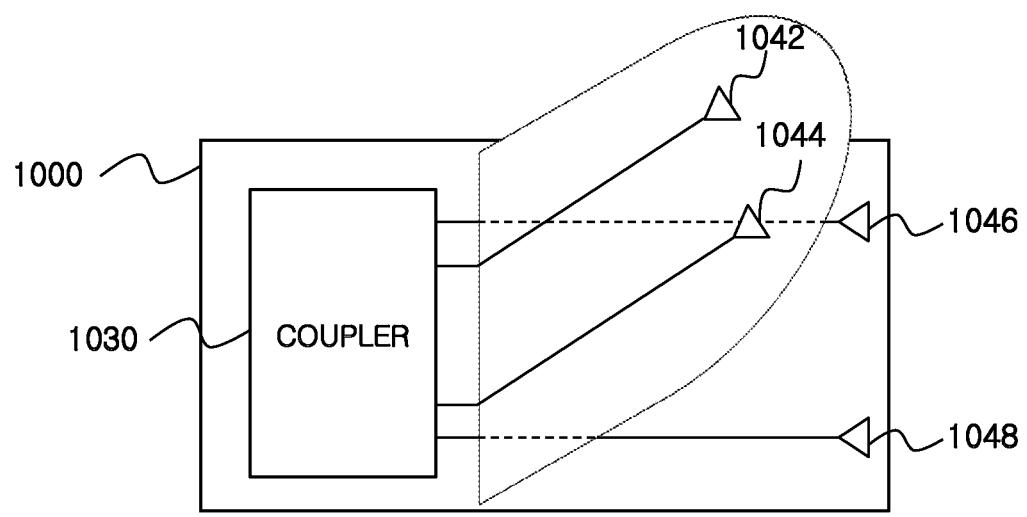
FIG. 10 is a diagram illustrating a configuration of antennas according to an embodiment of the disclosure.

FIG. 10 is a diagram illustrating a configuration of antennas according to an embodiment.

Antennas 1042, 1044, 1046, and 1048 which are connected to a coupler 1030 and switched in an electronic device 1000 may be located in a variety of locations. For example, a primary antenna 1042 and a diversity antenna 1044 may be located in a protruding portion of the electronic device 1000, and a first backup antenna 1046 and a second backup antenna 1048 may be located on a base substrate of the electronic device 1000. The first backup antenna 1046 and the second backup antenna 1048 may be patterned on the base substrate of the electronic device 1000.

In an example embodiment, the electronic device 1000 may be installed or located in a vehicle. For example, the electronic device 1000 may be a telematic control unit (TCU) mounted in a vehicle or a part of TCU, but is not limited thereto. For example, the electronic device 1000 may be a shark fin antenna of a vehicle or a part of the shark fin antenna. In an embodiment, the primary antenna 1042 and the diversity antenna 1044 may be located in the shark fin antenna of a vehicle as illustrated in FIG. 10. The first backup antenna 1046 and the backup antenna 1048 may be located parallel to the electronic device 1000 or the roof of the vehicle. The primary antenna 1042 and the diversity antenna 1044 may be located on a first part protruding in the shark fin antenna. In an embodiment, the first backup antenna 1046 and the second backup antenna 1048 may be located on a second part which is protruding less or not protruding in the shark fin antenna. The first backup antenna 1046 and the second backup antenna 1048 may be located in different locations in a vehicle, such as side mirrors.

In the event of a traffic accident, an exposed or protruding portion of a vehicle may be damaged. When antennas located in the protruding portion, such as the primary antenna 1042 and the diversity antenna 1044, are damaged due to the accident, it may be difficult to perform vehicular communication as intended. According to an embodiment, backup antennas 1046 and 1048 may be used by antenna switching when main antennas 1042 and 1044 are damaged, thereby improving sustainability of vehicular communication. According to an embodiment, when antenna switching is performed based on the transmission signals, sustainability of vehicular communication may be improved.

In an embodiment, backup antennas 1046 and 1048 may point in a different direction than the primary antenna 1042 and the diversity antenna 1044. Communication efficiency of the primary antenna 1042 and the diversity antenna 1044 may be higher when the vehicle is on flat ground, and the communication efficiency of the backup antennas 1046 and 1048 pointing in a different direction than the primary antenna 1042 and the diversity antenna 1044 may be higher when the vehicle is on a steep uphill or downhill. According to an embodiment, the backup antennas are not only used when there was a traffic accident, but also antenna switching can be performed by regularly checking transmission signals, and the efficiency of vehicle communication may be improved.

In an embodiment, antenna switching may be temporary. The electronic device 1000 may determine whether to perform antenna switching with a certain period, and may switch back to a previous antenna when it is detected that an obstacle to the previous antenna has disappeared.

In an embodiment, a notification indicating that antenna switching is performed may be provided to a user. The notification may be provided through an infotainment system of the vehicle. According to an embodiment, when a problem occurs in some antennas of the vehicle, vehicle communication is maintained using another antenna, and the user may immediately recognize that the problem has occurred.

The methods may be performed by hardware, software, or a combination of hardware and software according to an embodiment. When an embodiment is embodied by using software, one or more programs (software, software module) may be used. A program may be included in a computer-readable recording medium, but is not limited thereto. A program may be included in a computer program product. The computer-readable recording medium storing a program may be included in the computer program product. A program may be configured to be executable by one or more processors in the electronic device. The one or more processor may include instructions which, when executed by one or more processors in the electronic device, cause the electronic device to perform the methods according to an embodiment.

Here, a computer readable recording medium may be volatile, non-volatile, or a combination of volatile and non-volatile, where appropriate. The computer readable recording medium may include a computer storage medium and communication medium. The computer-readable recording media may be any available media that can be accessed by a computer and include both volatile and nonvolatile media and both detachable and non-detachable media. Furthermore, the computer-readable recording media may include computer storage media and communication media. The computer storage media include both volatile and nonvolatile and both detachable and non-detachable media implemented by any method or technique for storing information such as computer-readable instructions, data structures, program modules, or other data. The communication media typically embody computer-readable instructions, data structures, or program modules, and include any information transmission media. Embodiments of the disclosure may be implemented through a computer-readable recording medium or a computer program product having recorded thereon computer-executable instructions such as program modules that are executed by a computer. A plurality of computer-readable recording media may be distributed in computer systems which are connected via a network, data stored in the distributed recording media such as instructions and codes may be executed by at least one processor.

Functions of various elements illustrated in drawings may be provided by using not only hardware which is capable of executing related software but also dedicated hardware. When a function is provided by a processor, the function may be provided by a dedicated processor, a single shared processor, or a plurality of individual processors of which a part may be shared.

In present disclosure, the term such as "unit" or "module" should be understood as a unit in which at least one function or operation is processed. A component termed as "unit" or "module" may be embodied as hardware, software, or a combination of hardware and software.

Here, the term "processor", "controller", or "control unit" should not be interpreted as only referring to hardware executable of software, and may include a digital signal processor hardware, a read-only memory, random access memory, and volatile storing device for storing software.

Here, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It should be understood that when a component is referred to as being "connected to" or "coupled to" another component, it may be directly connected or electrically connected to other elements or provided with intervening elements therebetween.

Operations or steps of all methods described herein can be performed in an appropriate order unless otherwise indicated herein or otherwise clearly contradicted by context, and not limited to the indicated other. The use of any and all examples, or exemplary language (e.g., "such as") provided herein, is intended merely to clearly describe the exemplary embodiments and does not pose a limitation on the exemplary embodiments unless otherwise claimed. For example, each function may be performed in a distributed way or a combined way.

Disclosed embodiments may have different forms and should not be construed as being limited to the descriptions set forth herein. Rather, these embodiments are provided so that this disclosure will be thorough and complete and will fully convey the concept of the embodiments to one of ordinary skill in the art.

What is claimed:

1. An electronic device comprising:
a transceiver associated with a plurality of antennas; and
at least one processor configured to:
transmit a first signal by using a preset first antenna of the plurality of antennas;
receive a second signal coupled from the first signal;
determine a comparison result by comparing the first signal and the second signal;
perform antenna switching based on the comparison result; and
use a second antenna based on the antenna switching,
wherein the antenna switching is performed based on a number of times that the comparison result satisfies a condition.

2. The electronic device of claim 1,
wherein the at least one processor is further configured to control the second antenna to transmit the first signal to another electronic device.

3. The electronic device of claim 1,
wherein the first antenna is predetermined based on an antenna path stored in a memory, and
wherein the antenna switching is performed by setting the second antenna as part of the antenna path.

4. The electronic device of claim 3,
wherein the second antenna is temporarily set as the part of the antenna path.

5. The electronic device of claim 3,
wherein the antenna path is set according to a frequency band.

6. The electronic device of claim 1, further comprising:
a coupler for coupling from the first signal,
wherein the second signal is a feedback signal of the first signal.

7. The electronic device of claim 1,
wherein the comparison result is determined based on a difference between measured values of the first and second signals.

8. The electronic device of claim 1,
wherein the comparison result is determined based on a difference between measured values of the first and second signals in a log scale.

9. The electronic device of claim 1,
wherein the antenna switching is performed when the number of times that the comparison result satisfies the condition exceeds a threshold value, and
wherein the threshold value is determined based on another number of times that the first signal and the second signal are compared.

10. The electronic device of claim 9,
wherein the other number of times that the first signal and the second signal are compared is determined by comparing the first signal and the second signal for a certain period of time.

11. The electronic device of claim 1,
wherein the comparison result is a first comparison result,
wherein the at least one processor is further configured to determine a second comparison result by comparing signals received through the first and the second antennas, and
wherein the antenna switching is performed based on the first comparison result and the second comparison result.

12. The electronic device of claim 11,
wherein the first comparison result is determined based on a first threshold value and a difference between measured values of the first and second signals,
wherein the second comparison result is determined based on a second threshold value and a difference between measured values of the signals received through the first and the second antennas, and
wherein the second threshold value is greater than the first threshold value.

13. The electronic device of claim 1,
wherein the at least one processor is further configured to determine a measurement result by measuring a voltage applied to the first antenna, and
wherein the antenna switching is performed based on the comparison result and the measurement result.

14. The electronic device of claim 13,
wherein the antenna switching is performed based on a number of times that the measurement result satisfies a condition.

15. The electronic device of claim 1,
wherein the comparison result is a first comparison result,
wherein the at least one processor is further configured to:
determine a second comparison result by comparing signals received through the first and the second antennas; and
determine a measurement result by measuring a voltage applied to the first antenna when the second comparison result satisfies a first condition, and
wherein the antenna switching is performed when the measurement result satisfies a second condition.

16. The electronic device of claim 1,
wherein the electronic device is located in a vehicle, and
wherein the at least one processor is further configured to provide to a user of the vehicle a notification regarding the antenna switching.

17. The electronic device of claim 1,
wherein the plurality of antennas comprises at least one first antenna parallel to a body surface of a vehicle and at least one second antenna protruding from the body surface of the vehicle.

18. A method comprising:
transmitting a first signal by using a preset first antenna of a plurality of antennas;
receiving a second signal coupled from the first signal;
determining a comparison result by comparing the first signal and the second signal;
performing antenna switching based on the comparison result; and
using a second antenna based on the antenna switching, wherein the antenna switching is performed based on a number of times that the comparison result satisfies a condition.

19. A non-transitory computer readable medium comprising instructions, when executed by at least one processor, that cause the at least one processor to perform the method of claim 18.

* * * * *